United States Patent [19]

Osborn

[11] Patent Number: 4,977,789
[45] Date of Patent: Dec. 18, 1990

[54] VEHICLE SHIFT LEVER ASSEMBLY

[75] Inventor: Charles Osborn, Spring Lake, Mich.

[73] Assignee: Grand Haven Stamped Products Company, div. of JSJ Corporation, Grand Haven, Mich.

[21] Appl. No.: 410,343

[22] Filed: Sep. 21, 1989

[51] Int. Cl.$^5$ ............................ G05G 9/18; G05G 5/06
[52] U.S. Cl. ...................................... 74/475; 74/473 R; 74/533
[58] Field of Search ...................... 74/473 R, 475, 476, 74/477, 533

[56] References Cited

U.S. PATENT DOCUMENTS

| | | | |
|---|---|---|---|
| 2,961,890 | 11/1960 | Marshall | 74/477 |
| 2,983,160 | 5/1961 | Hause | 74/533 X |
| 3,018,670 | 1/1962 | Lohn | 74/477 |
| 3,765,261 | 10/1973 | Hobbins | 74/477 |
| 4,077,276 | 3/1978 | Knox, Jr. | 74/475 |
| 4,118,999 | 10/1978 | Bieber | 74/475 |
| 4,126,054 | 11/1978 | Langford et al. | 74/475 |
| 4,282,769 | 8/1981 | Sandrock | 74/475 |
| 4,324,149 | 4/1982 | Johansson et al. | 74/475 X |
| 4,398,433 | 8/1983 | Sonns | 74/475 |
| 4,515,032 | 5/1985 | Olmsted | 74/473 R |
| 4,565,151 | 1/1986 | Buma | 74/475 X |

Primary Examiner—Allan D. Herrmann
Attorney, Agent, or Firm—Price, Heneveld, Cooper, DeWitt & Litton

[57] ABSTRACT

In a vehicle shift lever assembly for a vehicle in which the shift lever is offset to one side of the transmission actuator arm and in which the lockout mechanism is released by depressing the shift lever, a means is provided to minimize undesirable tipping or turning of the shift lever. Within the preferred form, a plunger and plunger housing combination is provided with sufficient bearing surfaces to minimize tipping and an anti-rotation pin is provided to minimize turning of the shift lever. A detent is also provided to minimize the lockout pin from jumping out of the notch in the lockout plate except when a depressing force is applied to the shift lever.

18 Claims, 4 Drawing Sheets

4,977,789

VEHICLE SHIFT LEVER ASSEMBLY

BACKGROUND OF THE INVENTION

Many trucks and off-road vehicles have drive trains that provide driving torque to all four wheels of the vehicle. This is generally accomplished by a transfer case used to selectively shift the drive train to one of four modes which are: two-wheel, high; four-wheel, high; neutral; and four-wheel, low. In present day transfer cases, the shifting of the drive train into one of these four modes is accomplished by the actuation of a single actuator extending outwardly from the transfer case housing and to which is attached one end of a selector rod, the other end being connected to an arm actuator which is a part of a vehicle shift lever assembly. The vehicle shift lever assembly includes a shift lever which extends upwardly into the driver's compartment, much like the conventional floor shift lever which extends from the vehicle's primary transmission.

Frequently the transfer case is not aligned directly under the place in the vehicle where the shift lever is to be located. Thus, the shift lever is off-set so as to be spaced laterally and upwardly from the transfer case. Further, the present vehicle shift lever assembly utilized in the shifting of the drive train of a transfer case includes a lockout/mounting plate secured to the transfer case and having a slot with a plurality of notches. A lockout pin extends into the slot and the position of the shift lever and actuator arm is set by locating the pin in a selected one of the notches. In order to move the pin from one notch to the next it is necessary that the pin be depressed downwardly out of one notch and moved in the slot to another notch. In one present day lever assembly this is accomplished by a mechanism whereby the shift lever is pivoted about a horizontal axis extending in a direction along the fore and aft axis of the transfer case which requires pivoting the shift lever in two different directions.

Because of the difficulty in the shifting of the drive train in the transfer case by pivoting the shift lever in two different directions, it has been proposed to shift the drive train of a transfer case by depressing the shift lever to move the lockout pin out of the notches of the mounting/lockout plate. However, this creates a substantial problem because of the aforementioned location of the shift lever being spaced laterally from the transfer case and thus the lockout/mounting plate mounted thereon.

SUMMARY OF THE INVENTION

The present vehicle shifter lever assembly provides for actuating the drive train of a transfer case with a shift lever spaced above and to one side of the transfer case and provides for the actuation of the actuator arm connected to the connecting rod of the transfer case by means of depressing the shift lever downwardly and then rotating it forwardly or rearwardly. This is accomplished with a structure that prohibits tipping or rotating or turning of the shift lever about axes other than the axes on which the actuating arm is to be rotated. Accordingly, the proper feel on actuation of the shift lever is provided and any accidental shifting caused by the lockout pin jumping out of a desired notch of the lockout/mounting plate is prohibited.

The above desired result is obtained by providing a plunger mounted adjacent the lower end of the shift lever and extending into a plunger housing secured to the actuator arm attached to the lockout/mounting plate. The lockout pin is secured to the plunger and the shift lever. A spring is provided in the plunger housing for biasing the plunger upwardly causing the lockout pin to be biased upwardly into one of the notches of the lockout/mounting plate. Thus depressing the shift lever moves the locking pin out of the notches permitting the shift lever to pivot and the locking pin to move from one notch to another.

The plunger and the plunger housing are sufficiently long to provide the necessary stability to the entire assembly thus assisting in preventing the rotation of the lever except about the pivot axis of the actuator arm. In rotating the lever about such axis, the plunger, plunger housing and actuator arm all rotate in unison. In addition to the plunger housing and plunger as above described, an anti-rotation means in the form of a pin for preventing undesirable rotation of the shift lever is provided.

The above described structure includes an upper member to which the shift lever, plunger, lockout pin and means for guiding the anti-rotation pin are all secured. Below the upper member is a lower member supporting the actuator arm, the anti-rotation pin and plunger housing. These two members and the respective elements supported thereby are pivotable together about the pivot axis of the actuator arm. The upper member however is movable downwardly when the shift lever is depressed and is otherwise biased upwardly into locked position for holding the actuator arm in selective positions to control the drive train of the transfer case.

In one embodiment of this invention, I also provide a detent means for assisting in the holding of the lockout pin in selected ones of the notches in the lockout/mounting plate.

It will be obvious from the above description and the following specific descriptions that the vehicle shift lever assembly of this invention is a rugged but smooth operating assembly that accomplishes the desired result of selectively setting the drive train of a transfer case by depressing and rotating a shift lever that is offset and spaced above and laterally to the side of the transfer case.

The function and advantages of the present invention will become apparent after considering the following detailed specification which discloses preferred embodiments thereof in conjunction with the accompanying drawings wherein:

DESCRIPTION OF THE PREFERRED EMBODIMENT

Figure 1:
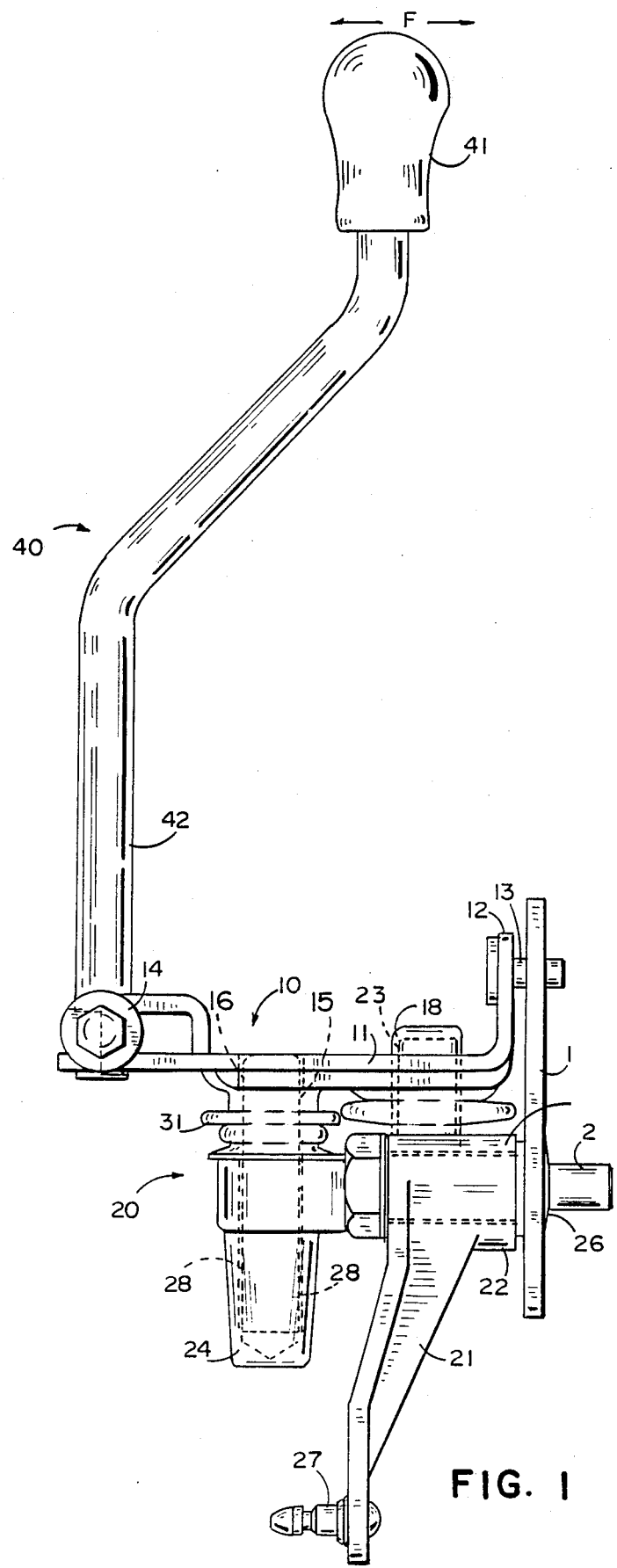
FIG. 1 is a front, elevational view of the shift lever assembly of this invention.

Referring to the drawings and more particularly by reference numeral, in all of FIGS. 1-6, reference numeral 1 designates a lockout/mounting plate, reference numeral 10 designates an upper plate subassembly and reference numeral 20 designates a lower cast subassembly. The upper plate subassembly 10 and the lower cast subassembly 20 are rotatable on lockout/mounting plate 1 about the pivot pin 2.

Lockout/mounting plate 1 is adapted to be secured to a lower case by means of conventional fasteners (not shown) extending through the openings 3a, 3b, and 3c (FIGS. 3, 4, 5 and 7). As shown in FIGS. 3, 4, 5 and 7, the mounting plate 1 includes a slot 5 having the detent notches 6, 7 and 9 extending therefrom. The slot 5 and notches 6, 7 and 9 are adapted for receiving a lockout pin as will be described hereinafter. The lockout/mounting plate 1 also includes an opening 8 receiving the pivot bolt 2 which rotatably supports the subassemblies 10 and 20 in a position for actuating the drive train of a transfer case.

Figure 2:
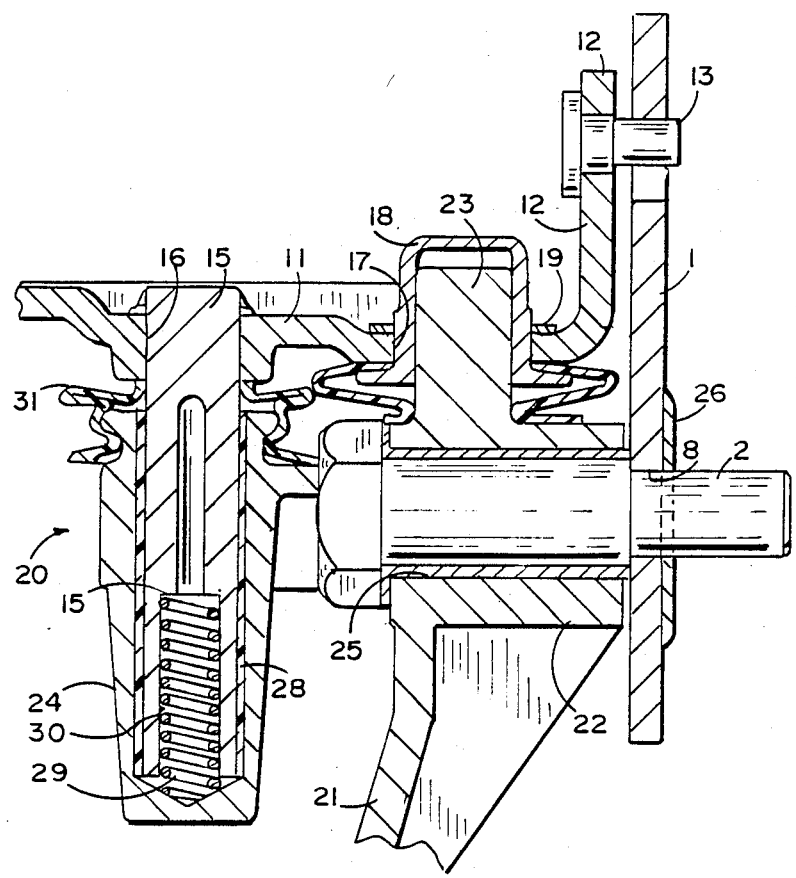
FIG. 2 is a cross-sectional view taken along the plane II—II of FIG. 6.

The upper plate subassembly 10 is a stamped plate 11 having a configuration as is best disclosed in FIG. 1. Plate 11, stamped in the configuration as shown in FIG. 1, includes a flange 12 at one end to which is attached the lockout pin 13. At the other end of the plate 11 spaced from the flange 12, the plate is configured to provide a clamp 14 for supporting the shift lever or handle 40. Intermediate the two ends 12 and 13 is a plunger 15 secured in the opening 16 of the plate 11 and extending downwardly as best illustrated by FIG. 2. An opening 17 is provided intermediate the plunger and the flange 12 to receive an anti-rotation pin as will be described. A cap 18 is secured in the opening 17 for the purpose of receiving and covering the anti-rotation pin. The cap 18 is held in the opening 17 by the clip 19.

The lower cast subassembly includes the actuator arm 21 extending downwardly from a hub 22. An anti-rotation pin 23 cast integrally with the hub 22 extends upwardly into the cap 18 and is slidable within cap 18. A plunger housing 24 is also integrally cast with the hub 22 and actuator arm 21 so that the plunger housing 24, the anti-rotation pin 23, the hub 22 and the actuator arm 21 are all one casting secured to the lockout/mounting plate 1 by means of the pivot bolt 2 extending through the opening 25 of the hub 22. The pivot bolt is secured in place by a push nut 26, it being understood that after assembly of push nut 26, the pivot bolt must turn freely by hand so that the casting can be pivoted freely about the axis of pivot bolt 2. The control link pin 27 is secured to the end of the actuator arm 21 for receiving a rod (not shown) that connects actuator arm 21 to an arm (not shown) located outside of the transfer case for selectively shifting the drive train of the transfer case.

Having described the two subassemblies 10 and 20, the interfitting of these two subassemblies should be evident from the drawings. As disclosed, the plunger 15 extends into the plunger housing 24 and is easily slidable therein within a nylon bearing 28. A series of ball bearings could be substituted for the nylon bearing 28. Plunger 15 is biased upwardly by means of spring 30 located in the bore 29 of plunger 15. The spring is constantly under compression so that it constantly biases the plunger and consequently the entire upper plate subassembly upwardly. A boot 31 is secured to upper plate 11 and the plunger housing 24 to prevent any foreign materials or debris from entering into the housing and adversely affecting the sliding action of the plunger in the housing.

Also as disclosed in FIG. 2, the pin 23 is slidably mounted in the cap 18. Boot 32 is secured to plate 11 and hub 22 to prevent any foreign material or debris from entering into the inside of cap 18 and adversely affecting the sliding action of pin 23 in cap 18.

Figure 6:
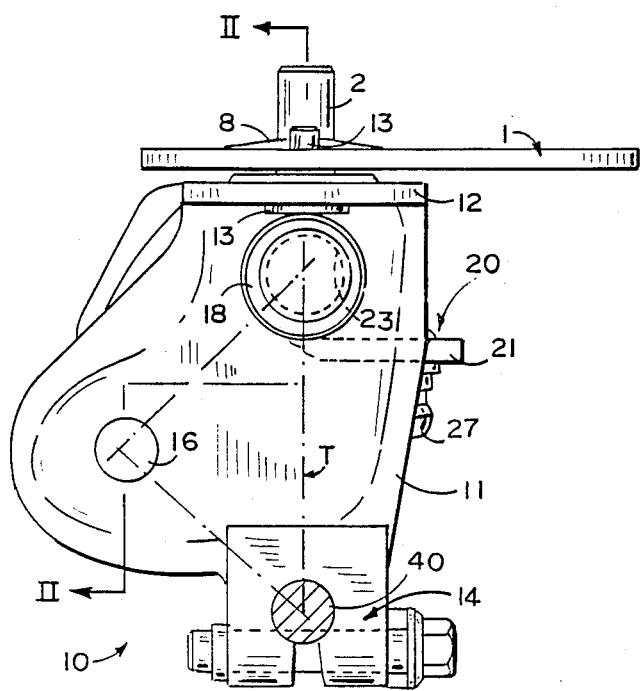
FIG. 6 is a plan view of the assembly.

Referring to FIG. 6, it will be noted that the axes of the shift lever 40, the plunger 16 and the anti-rotation pin 23 are located on the corners of a triangle "T" so as to give stability to shift lever 40; that is, the position of the three axes minimizes rotation, tipping and/or turning of shift lever 40 except for the rotation about the axes of the pivot bolt 2.

OPERATION

Having described my invention, the operation should be evident. It should be understood that both of the subassemblies 10 and 20 rotate together about the axis of the pivot bolt 2. The only relative movement between the two subassemblies 10 and 20 is the up-and-down motion of the upper plate subassembly 10 with respect to the lower subassembly 20. This is accomplished by applying a force to the knob 41 as indicated by the arrow "F". The force is sufficient to depress the spring which preferably has approximately a 7.5 lb. force. It will be noted that the shaft 42 of the shift lever 40 is bent so that the knob 41 is approximately above the flange 12. The purpose of this is to minimize any tipping of plate 11, flange 12 and pin 13. In other words, the forces are distributed more evenly along the entire plate 11.

Figure 7:
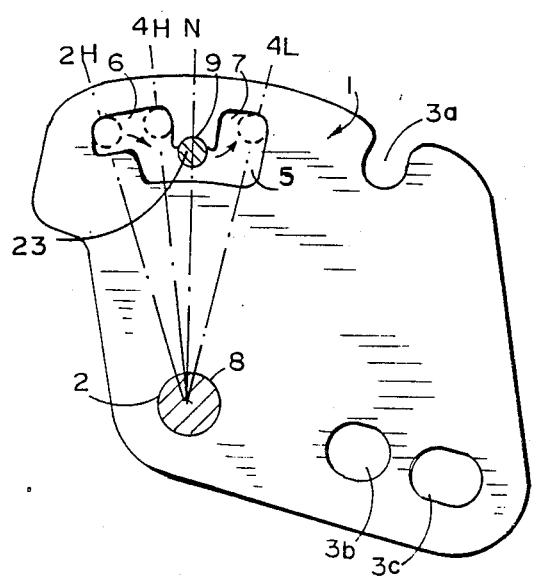
FIG. 7 is one side, elevational view of the lockout/mounting plate showing the lockout pin in the various modes.

When the force "F" is applied to the knob 41, the pin 13 is pushed downwardly from one of the notches in which it is located into the slot 5 (FIG. 7) permitting rotation of shift lever 40 and the entire subassemblies 10 and 20 Consequently, actuator arm 21 is rotated to shift the drive chain of the transfer case. In such shifting action, pin 13 is moved from one of the notches 6, 7 and 9 which determines the mode of the drive train of the transfer case, i.e., whether it is two-wheel, high speed (2H); four-wheel, high speed (4H); neutral (N) or four-wheel, low speed (4L) (FIG. 7). Once the selected mode is reached by rotating the entire assembly (i.e., subassembly 10 and the subassembly 20, while the shift lever is depressed) the force "F" exerted on the handle is released causing upper assembly 10 to be biased upwardly by spring 29 causing lockout pin 13 to move into one of the selected notches as disclosed in FIG. 7.

With this mechanism as above described, the desired stability and feel to satisfy the human factor considerations is obtained despite the fact that the shift lever is located at a position spaced to the side of the transfer case. The requirement to rotate the shift lever in two directions in order to shift from one mode to the other is eliminated. Further, the rotation or tipping of shift lever 40 about any other axis than the axis of the pivot bolt 2 is substantially minimized.

MODIFICATION

Figure 8:
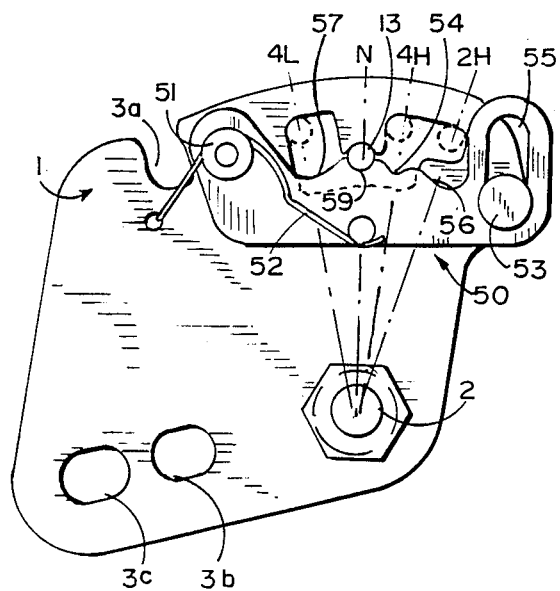
FIG. 8 the opposite side, elevational view of the lockout/mounting plate disclosing an embodiment in which a detent plate is provided for holding the lockout pin in either of the four modes or positions.
Figure 3:
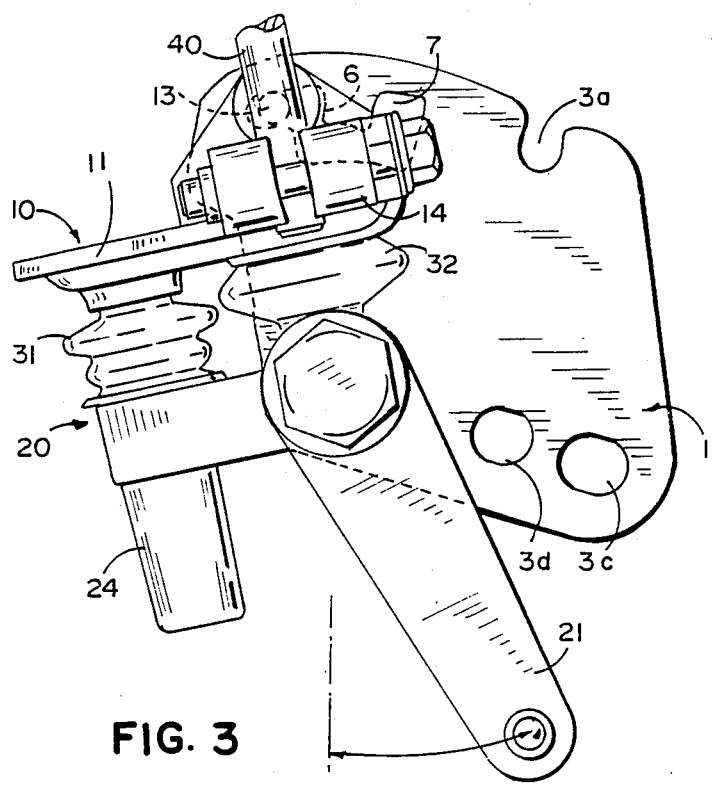
FIG. 3 is a side, elevational view of the assembly in the two-wheel drive, high speed position.
Figure 5:
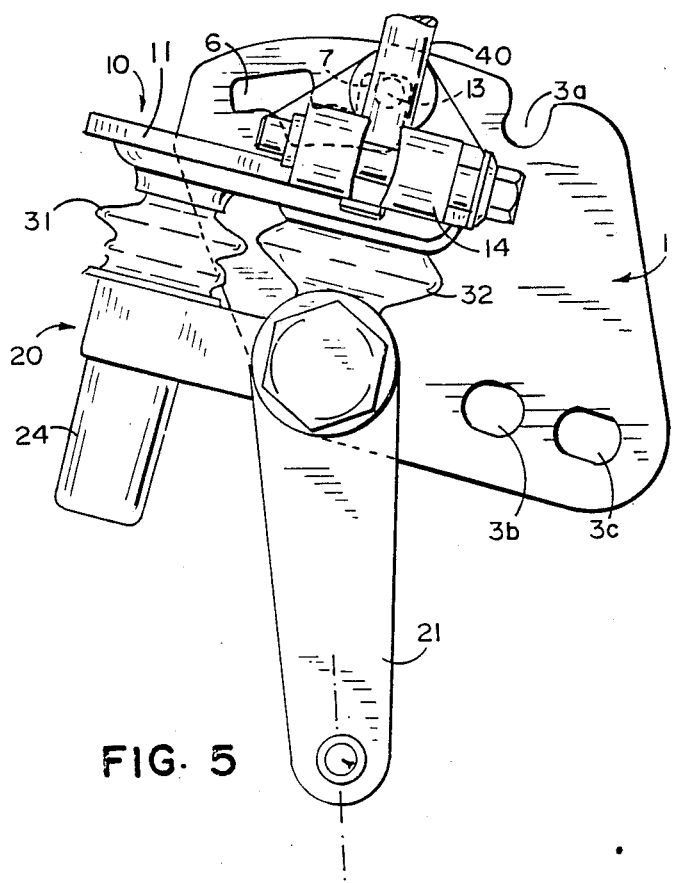
FIG. 5 is a side, elevational view of the assembly in the four-wheel drive, low speed mode.
Figure 4:
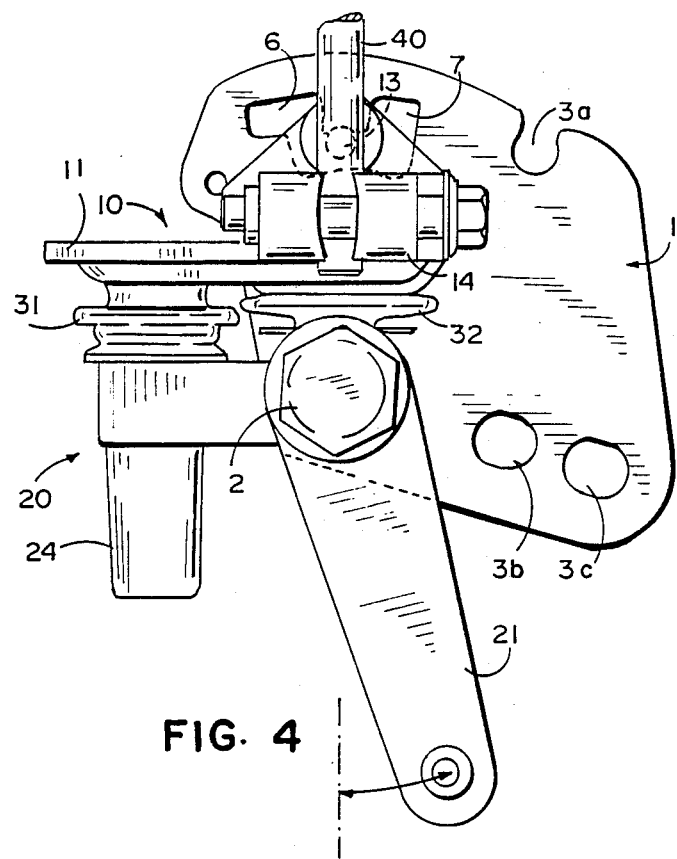
FIG. 4 is a side, elevational view of the assembly in the neutral position.

FIG. 8 discloses an embodiment of my invention in which the two subassemblies 10 and 20 are identical to that above described. In the embodiment of FIG. 8, a detent plate 50 is added. Detent plate 50 is pivoted on the lockout/mounting plate 1 in the position as shown by the pin 51 and is biased in a counterclockwise direction as viewed in FIG. 8 by a leaf spring 52. The leaf spring 52 is of sufficient strength to hold the detent 50 against the lockout pin 13 but is capable of being overcome by the normal force "F" (FIG. 1) exerted on the knot 41 of shift lever 40 when shifted from one mode to another. The plate is guided on the end opposite the pin 51 by a second pin 53 riding in the slot 57. Detent plate 50 has a plurality of notches 57, 59, 54, and 57 for holding the pin in place in the 4L, N, 4H, and 2H modes, respectively. As disclosed, the ramps are provided adjacent each notch to facilitate the lockout pin 13 in moving the detent plate 50 out of its holding position as the shift lever 40 is depressed and rotated from one mode to another.

Having disclosed the preferred embodiment of my invention, it should be understood that many changes, modifications, variations, other uses and applications of the shift lever assembly will become apparent to those skilled in the art after considering this specification and the accompanying drawings. All such changes, modifications, alterations and other uses and applications which do not depart from the spirit and scope of the invention are deemed to be covered by the following claims.

The embodiments of the invention in which an exclusive property or privilege is claimed are defined as follows.

1. A shift lever assembly for an automotive vehicle transmission in which a shift lever and a lockout/mounting means is provided; means for mounting said assembly to the casing of a transmission mechanism for rotating said shift lever about a predetermined axis and for locking said shift lever in selected positions; said shift lever when mounted to the casing of said transmission extending from a position spaced horizontally from said lockout/mounting means to a level above said lockout/mounting means; an actuator arm extending downwardly from said lockout/mounting means and having at least its upper portion thereof spaced horizontally from the shift lever; connecting means extending between said lever, the said lockout/mounting means and the upper portion of said arm for operatively connecting said actuator arm to said shift lever whereby said shift lever can pivot said arm about a horizontal axis; means for shifting said shift lever and actuator arm to a plurality of different lockout positions; lockout means for holding said shift lever and actuator arm in one of said lockout positions at any one time; release means operated by pushing downwardly on said shift lever for releasing said lockout means to permit said shift lever and actuator arm, while said shift lever is being depressed, to be shifted to different lockout positions; and an anti-rotation means for preventing the shift lever from turning or rotating about any axis other than said horizontal axis.

2. The shift lever assembly of claim 1 in which the anti-rotation means includes a pin.

3. The shift lever assembly of claim 1 in which the release means comprises a plunger housing mounted adjacent the shift lever; a plunger attached adjacent the lower end of said shift lever and extending into the plunger housing; and biasing means for biasing said shift lever upwardly into one of the several lockout positions at any one time.

4. The shift lever assembly of claim 3 in which the plunger housing is sufficiently deep and the plunger is sufficiently long to provide sufficiently long bearing forces on the side surfaces of said plunger whereby the shift lever is prevented from tipping away from or toward said mounting means.

5. The shift lever assembly of claim 3 in which a bearing means is provided between said plunger and inside wall of said plunger housing.

6. The shift lever assembly of claim 5 in which said bearing means is a plastic lubricous liner.

7. A shift lever assembly for an automotive vehicle transmission in which a shift lever and lockout/mounting means is provided; means for mounting said assembly to the casing of a transmission mechanism for rotating said shift lever about a predetermined axis and for locking said shift lever in selected positions; said shift lever when mounted to the lockout/mounting means extending from a position spaced horizontally from said lockout/mounting means upwardly to a level above said lockout/mounting means; an actuator arm extending downwardly from said lockout/mounting means and having at least its upper portion thereof spaced horizontally from the lower portion of the shift lever; connecting means extending between said lever, the said lockout/mounting means and the upper portion of said arm for operatively connecting said actuator arm to said shift lever whereby said shift lever can pivot said arm about a horizontal axis; means for shifting said shift lever and actuator arm to a plurality of different lockout positions; lockout means for holding said shift lever and actuator arm in one of each of said lockout positions at any one time; release means operated by pushing downwardly on said shift lever for releasing said lockout means to permit sand shift lever and actuator arm, while said shift lever is being depressed, to be shifted to different lockout positions; said release means comprising a plunger attached adjacent the lower end of said shift lever and extending into the plunger housing attached to said arm; and biasing means for biasing said plunger upwardly into one of the several lockout positions at any one time; said plunger housing being sufficiently long to provide sufficiently long bearing forces on the side surfaces of said plunger whereby the shift lever is prevented from tipping away from or toward said mounting means.

8. The shift lever assembly of claim 7 in which a bearing means is provided between said plunger and inside wall of said plunger housing.

9. The shift lever assembly of claim 8 in which said bearing means is a plastic lubricous liner.

10. A shift lever assembly for an automotive vehicle transmission comprising a lockout/mounting plate for mounting said assembly; means adapted for mounting said lockout/mounting plate to the casing of a transmission mechanism in a vertical position; a transmission actuator arm having its upper end pivotally mounted on said lockout/mounting plate about a horizontal axis; a shift lever spaced horizontally from said mounting plate for actuating said actuator arm; connecting means between said upper end of said actuator arm and said shift lever for connecting said arm and lever whereby rotation of said lever rotates said actuator arm to different transmission positions to change the mode of the gear train of said transmission in each of said positions; said plate having a plurality of lockout notches connected by a slot in said plate; a lockout pin operatively connected to said shift lever through said connecting means and received in said slot and lockout notches and adapted to move selectively through said slot from one notch to another; a plunger extending downwardly from said shift lever; a plunger housing connected to said actuator arm and receiving said plunger; biasing means in said plunger housing biasing said plunger upwardly for holding said pin in selected ones of said notches, one at a time; said biasing means forcing the lever, connecting means, and locking pin upwardly whereby said pin is biased into one of said notches so as to hold the pin in said one notch and the shift lever and actuator arm in a predetermined position to set the mode of the gear train of said transmission.

11. The shift lever assembly of claim 10 in which the connecting means includes an anti-rotation means for preventing the shift lever from rotating, tipping or turning about any axis other than said horizontal axis.

12. A shift lever assembly for an automotive vehicle transmission comprising a lockout/mounting plate for mounting said assembly; means adapted for mounting said lockout/mounting plate to the casing of a transmission mechanism in a vertical position; a transmission actuator arm having its upper end pivotally mounted on said lockout/mounting plate about a horizontal axis; a shift lever connected to said actuator arm at a position spaced horizontally from said mounting plate for actuating said actuator arm; connecting means between said upper end of said actuator arm and the lower end of said shift lever for operatively connecting said arm and lever whereby rotation of said lever rotates said actuator arm to different transmission positions to change the mode of the gear train of said transmission in each of said positions; said plate having a plurality of lockout notches connected by a slot in said plate; a lockout pin operatively connected to said shift lever and received in said slot and lockout notches and adapted to move selectively through said slot from one notch to another; biasing means for holding said pin in selected ones of said notches, one at a time; said biasing means forcing the lever and locking pin upwardly whereby said pin is biased into one of said notches so as to hold the pin in said one notch and the shift lever and actuator arm in a predetermined position to set the mode of the gear train of said transmission; said shift lever being downwardly depressible against the force of said biasing means to force the pin downwardly into said slot for permitting a shifting of said pin from one notch and rotation of said shift lever to another position wherein said pin is located in another notch; and an anti-rotation means for preventing the shift lever from rotating, tipping or turning about any axis other than the said horizontal axis.

13. The shift lever assembly of claim 12 in which said connecting means comprising an upper member and a lower member both extending from and pivotally mounted together on said mounting plate; one of said members having a lever support means adjacent one end remote from said mounting plate and supporting said shift lever and a plunger located adjacent and below said shift lever, the other of said members including said actuator arm and a plunger housing receiving said plunger; said two members also including cooperative elements providing an anti-rotation means for preventing rotating and turning of said lever about an axis other than said horizontal axis; said plunger and plunger housing and said cooperative elements permitting depression of said shift lever.

14. The shift lever assembly of claim 13 in which the said biasing means is located in said plunger housing forcing said plunger and upper member with the shift lever upwardly.

15. The shift lever assembly of claim 13 in which the cooperative elements are spaced from said vertical lockout/mounting plate and said plunger and plunger housing and include a pin on one member extending into a cylindrical opening in the other member.

16. A shift lever assembly for an automotive vehicle transmission in which a shift lever and lockout/mounting means is provided to mount said assembly to the casing of a transmission mechanism for rotating said shift lever about a predetermined axis and for locking said shift lever in selected positions; said shift lever adapted when mounted to the casing of said transmission to extend from a position spaced horizontally from said lockout/mounting means upwardly to a level above said transmission casing; an actuator arm extending downwardly from said lockout/mounting means and having at least its upper portion thereof spaced horizontally from the lower portion of said shift lever, connecting means extending between said lever, the said lockout/mounting means and the upper portion of said arm for operatively connecting said actuator arm to said shift lever whereby said shift lever can pivot said arm about a horizontal axis; means for shifting said shift lever and actuator arm to a plurality of different lockout positions; lockout means for holding said shift lever and actuator arm in one of each of said lockout positions at any one time; release means operated by pushing downwardly on said shift lever for releasing said lockout means to permit said shift lever and actuator arm, while said shift lever is being depressed, to be shifted to different lockout positions; and a spring biased detent means for holding said shift lever and actuator arm in a lockout position; said detent means being forced out of holding position by the depression and rotation of said shift lever.

17. The shift lever assembly of claim 16 in which said lockout means includes a pin and engagable at different lockout positions in different lockout notches and the detent means is a detent plate pivotally mounted on said mounting plate; said detent plate having notches for receiving said pin; and means biasing said detent plate against said pin for holding the pin in selected ones of said lockout notches.

18. A shift lever assembly for an automotive vehicle transmission comprising a lockout/mounting plate for mounting said assembly; means adapted for mounting said mounting plate to the casing of a transmission mechanism in a vertical position; a transmission actuator arm having its upper end pivotally mounted on said mounting plate about a horizontal axis; a shift lever having its lower portion thereof spaced horizontally from said mounting plate for actuating said actuator arm; connecting means between said upper end of said actuator arm and said shift lever for operatively connecting said arm and lever whereby rotation of said lever rotates said actuator arm to different transmission positions to change the mode of the gear train of said transmission in each of said positions; said connecting means comprising an upper member and a lower member both extending from and pivotally mounted together on said mounting plate; one of said members having a lever support means adjacent one end remote from said mounting plate and supporting said shift lever and a plunger located adjacent and below said shift lever, the other of said members including said actuator arm and a plunger housing receiving said plunger; said two members also including cooperative elements providing an anti-rotation means for preventing rotation and turning of said lever about an axis other than said horizontal axis; said plunger and plunger housing and said cooperative elements permitting depression of said shift lever.

* * * * *